United States Patent
Zhao et al.

(10) Patent No.: US 9,824,251 B2
(45) Date of Patent: Nov. 21, 2017

(54) AUTOMATING DEVICE TESTING USING RFID

(71) Applicant: Motorola Mobility LLC, Chicago, IL (US)

(72) Inventors: Hong Zhao, Naperville, IL (US); Scott Debates, Crystal Lake, IL (US); Alvin J Von Ruff, Mundelein, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/060,808

(22) Filed: Mar. 4, 2016

(65) Prior Publication Data

US 2017/0255799 A1     Sep. 7, 2017

(51) Int. Cl.
*G06K 7/10*     (2006.01)
(52) U.S. Cl.
CPC ................. *G06K 7/10366* (2013.01)
(58) Field of Classification Search
None
See application file for complete search history.

(56) References Cited

U.S. PATENT DOCUMENTS

| | | | | | |
|---|---|---|---|---|---|
| 6,104,291 | A * | 8/2000 | Beauvillier | ........... | G06K 7/0095 340/572.1 |
| 7,097,099 | B2 * | 8/2006 | Hepworth | ............. | G06F 9/5055 235/375 |
| 7,225,992 | B2 * | 6/2007 | Forster | ................. | G06K 7/0008 235/382 |
| 7,411,498 | B2 * | 8/2008 | Forster | ................. | G06K 7/0008 340/10.1 |
| 9,164,159 | B2 * | 10/2015 | Nath | .................... | G01R 35/007 |
| 9,237,465 | B1 * | 1/2016 | Tanner | ................. | H04B 5/0031 |

* cited by examiner

*Primary Examiner* — K. Wong (57) ABSTRACT

Device testing using radio-frequency identification (RFID) is described herein. The testing uses one or more RFID readers that interrogate an RFID tag on a mobile device and, in response to the interrogation, receive data from the RFID tag. The one or more RFID readers, in response to receipt of the data from the RFID tag, transmit a command to execute a test program on the mobile device. The results of the test program are then provided by the mobile device.

20 Claims, 5 Drawing Sheets

AUTOMATING DEVICE TESTING USING RFID

BACKGROUND

Portable devices, such as mobile phones, tablet devices, digital cameras, and other types of computing and electronic devices are manufactured in a factory on a manufacturing or assembly line. Typically, after devices have been fully assembled, factory tests are performed on the devices for quality assurance. Conventionally, factory tests are performed on the devices by a user following a manual process that involves powering on the device, plugging-in a communication cable, and issuing test commands from a terminal of a connected computing device to run the tests on the device. Consequently, this manual process requires a user to perform the factory tests which is time consuming and time limited based on how long it takes the user to perform the factory tests. Further, this manual process requires the manufacturing lines to be configured according to the type of communication cable being used based on a connection type of the communication cable. For instance, devices that have a USB 2.0 connector require a manufacturing line that includes USB 2.0 cables to perform the factory tests, while other devices that have a USB 3.0 connector require a reconfiguration to the manufacturing line which costs time and money.

BRIEF DESCRIPTION OF THE DRAWINGS

Embodiments of automating device testing using RFID are described with reference to the following Figures. The same numbers may be used throughout to reference like features and components that are shown in the Figures.

DETAILED DESCRIPTION

Embodiments of automating device testing using radio-frequency identification (RFID) are described herein. A mobile device is manufactured on an assembly line (also referred to herein as a manufacturing line) in a factory. The factory includes a testing system and one or more RFID readers. While the mobile device is traveling along the assembly line, the testing system uses the one or more RFID readers to remotely power on the mobile device and start a test program on the mobile device. The mobile device executes the test program and wirelessly communicates data generated by the test program to the testing system, after which the mobile device is powered off (e.g., remotely by the one or more RFID readers). Additionally, the one or more RFID readers can optionally transmit the test program to the mobile device.

In aspects of automating device testing using RFID, a mobile device includes an RFID tag to maintain a power-state indicator of whether the mobile device is in a powered-on state or in a powered-off state. The RFID tag in the mobile device can receive an interrogation from an external RFID reader and return the power-state indicator, which indicates that the mobile device is in a powered-on state (i.e., the mobile device is powered on) or a powered-off state (i.e., the mobile device is powered off). In one or more embodiments, an antenna of the RFID tag in the mobile device remains activated regardless of whether the mobile device is powered on or powered off, allowing the RFID tag to provide the power-state indicator regardless of whether the mobile device is powered on or powered off.

As used herein, the term "powered on" or the "powered-on state" indicates that a device is turned on and in an operational state, and the term "powered off" or the "powered-off state" indicates that the device is turned off. The term "powered-up" or "power-up" is used to indicate that a device is in the process of turning-on, such as when a user of the device presses the power switch to turn the device on, or when the power switch is toggled to turn the device on. After the device has "powered-up" from the "powered-off state", the device is in the "powered-on state". The term "powered-down" or "power-down" is used to indicate that a device is in the process of turning off, such as when the user of the device presses the power switch to turn the device off, or when the power switch is toggled to turn the device off. After the device has "powered-down" from the "powered-on state", the device is in the "powered-off state".

The mobile device also optionally includes a security module that provides security to the RFID tag, allowing only authorized entities (e.g., the testing system) to cause the test program to run and/or provide the test program to the mobile device. This security can be provided in various manners, such as by requiring proper credentials (e.g., a password) to run and/or provide a test program, validating or authenticating a provided test program, disabling the RFID tag prior to the mobile device leaving the factory, and so forth.

The automating device testing using RFID techniques discussed herein provide fast and efficient techniques for testing mobile devices being assembled or manufactured in the factory. Human operators need not be present to plug in the appropriate cables to run tests on the mobile devices, thereby reducing manufacturing cost and improving the efficiency of the factory. Furthermore, separate lines for mobile devices using different types of cables or connections need not be maintained, thereby further reducing manufacturing cost and improving the efficiency of the factory.

Although discussions of automating device testing using RFID techniques are included herein with reference to use in a factory or assembly line, it should be noted that these techniques can additionally or alternatively be implemented in other areas. For example, the techniques discussed herein can be used analogously in a customer service facility and/or repair shop. By way of another example, the techniques discussed herein can be used analogously in a Kiosk (e.g., for mobile diagnostics, data backup, data transfer between devices, and so forth).

While features and concepts of automating device testing using RFID can be implemented in any number of different devices, systems, environments, and/or configurations, embodiments of automating device testing using RFID are described in the context of the following example devices, systems, and methods.

Figure 1:
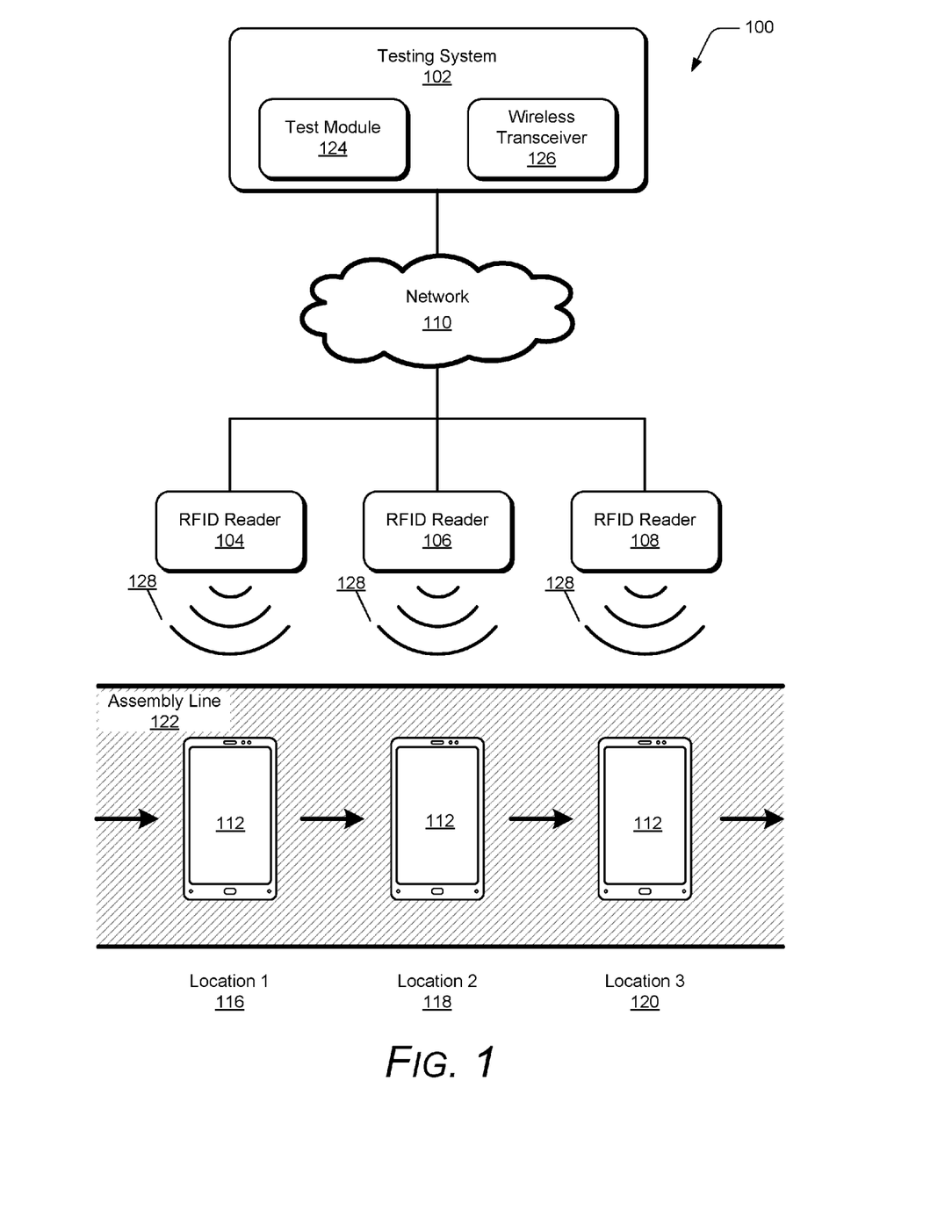
FIG. 1 illustrates an example environment in which embodiments of automating device testing using RFID can be implemented.

FIG. 1 illustrates an example environment 100 in which embodiments of automating device testing using RFID can be implemented. In this example, the environment 100 includes a testing system 102, RFID readers 104, 106, and 108, and a mobile device (e.g., mobile device 110). The testing system 102 is implemented using one or more of any of a variety of different types of computing devices or processing systems, such as a desktop computer, a server computer, a laptop or notebook computer, a system-on-chip (SoC) that processes computer-executable instructions, and so forth. The mobile device 110 can be any of a variety of different types of mobile devices, such as a mobile phone, a tablet device, a digital camera, or other types of computing and electronic devices.

The testing system 102 communicates with the RFID readers 104, 106, and 108 (also referred to as RFID interrogators) using wired and/or wireless communication channels or couplings. In one or more embodiments, the testing system 102 communicates directly with each RFID reader 104, 106, and 108. Additionally or alternatively, the testing system 102 communicates with an RFID reader 104, 106, and/or 108 using network 110. The network 110 can be implemented using any of a variety of different data networks, such as a Wi-Fi network, a wired local area network (LAN), and so forth. Although illustrated as separate from the testing system 102, alternatively one or more of the RFID readers 104, 106, and 108 can be included in the testing system 102.

The environment 100 also includes assembly line 122 for moving mobile devices to different physical locations along the assembly line 122, such as location 1 116, location 2 118, and location 3 120. The assembly line 122 can be implemented in various different manners, such as a conveyor belt, moving buckets or baskets in which products are placed, and so forth. The RFID readers 104, 106, and 108 communicate with the mobile device 112 as the mobile device 112 travels along assembly line 122. The RFID readers 104, 106, and 108 can each transmit an interrogation signal as a broadcast message requesting an RFID tag of the mobile device that is within communication range of the respective RFID reader to return data that the RFID tag has stored in memory. In implementations, an RFID tag of the mobile device 112 can wirelessly communicate data stored in memory of the RFID tag to the RFID reader 104 via a radio frequency (RF) communication channel in response to an interrogation signal from RFID reader 104. Further, the RFID readers 104, 106, and 108 at respective locations 1, 2, and 3 (116, 118, 120) can be arranged such that the communication ranges of each of the RFID readers do not interfere with one another when communicating with the mobile devices on the assembly line 122.

In one or more embodiments, an RFID reader 104, 106, and/or 108 includes an Application-specific Integrated Circuit (ASIC) or Central Processing Unit (CPU) module, a communication bus or communication device for communicating with the testing system 102, and a transmitter and receiver (or may be implemented as a transceiver) for two-way communication 128 with the RFID tag in the mobile device. For example, in response to receipt of data from the RFID tag of mobile device 112, the ASIC/CPU module of the RFID reader 104 formulates a response that may include the data from the RFID tag of mobile device 112, and the response is communicated to a test module 124 of testing system 102 via network 110. Additionally, in response to receipt of data from test module 124, the ASIC/CPU module of the RFID reader 104 formulates a response that may include the data from testing system 102 and/or test module 124, and the response is communicated to the RFID tag of the mobile device 112. The data signals from the mobile device 112 can be communicated using low frequency (LF), high frequency (HF), or ultra-high frequency (UHF) radio waves. The ASIC/CPU module can be implemented as fixed or programmable logic for processing the RFID reader data, as well as modulating and demodulating the RF signals.

In the illustrated example, the testing system 102 includes test module 124 and wireless transceiver 126. Test module 124 can be implemented as a software application or module, a firmware application or module, a hardware module, or a combination thereof. In one or more embodiments, the RFID readers 104, 106, and 108 operate autonomously, performing their respective operations herein without control from the testing system 102, but optionally providing data received from the RFID tag of the mobile device 112 to testing system 102. Additionally or alternatively, the RFID readers 104, 106, and 108 operate under the control of testing system 102 (e.g., test module 124).

In one or more embodiments, the RFID readers 104, 106, and 108 continuously scan for RFID tags of the mobile devices on the assembly line 122. For example, when a mobile device (e.g., mobile device 112) arrives at location 1 116 of the assembly line 122, the RFID reader 104 continuously transmits an interrogation signal as a broadcast message requesting RFID tags that are in range to return data that the RFID tags have stored. An RFID tag of the mobile device 112 receives the interrogation signal and responds with data of some type, such as an indicator that the RFID tag received the interrogation signal, a power-state indicator, an identifier of the RFID tag and/or the mobile device 112, and so forth. The RFID reader 104 receives the response from the RFID tag of the mobile device 112 and then the RFID reader 104 transmits a power-on command to the RFID tag of mobile device 112 to power on (i.e., turn on) mobile device 112. In this situation, the RFID reader transmits the power-on command without regard for whether the mobile device 112 is already powered on.

Alternatively, an RFID tag of the mobile device 112 receives the interrogation signal and responds with a power-state indicator (e.g., power-state indicator 238) that indicates whether the mobile device is powered on or powered off. The RFID reader 104 receives the power-state indicator from the RFID tag of mobile device 112, and communicates the power-state indicator to test module 124 of the testing system 102. The test module 124 can then determine whether the mobile device 112 is powered on or powered off based on the power-state indicator. If the test module 124 determines that the mobile device 112 is powered off, then the test module 124 can transmit a power-on command via RFID reader 104 to the RFID tag of mobile device 112 to power on (i.e., turn on) the mobile device 112. If the test module 124 determines that the mobile device 112 is powered on, then the test module 124 does not transmit the power on command.

Alternatively, the RFID reader 104 can itself determine whether the mobile device 112 is powered on or powered off. In such situations, when mobile device 112 arrives at location 1 116 of assembly line 122, the RFID reader 104 continuously transmits an interrogation signal requesting RFID tags that are in range to return data and information that the RFID tags have stored. The RFID tag of mobile device 112 receives the interrogation signal and responds with the power-state indicator. The RFID reader 104 receives the power-state indicator, and the RFID reader 104 then determines whether the mobile device 112 is powered on or powered off based on the received power-state indicator. If the RFID reader 104 determines that the mobile device 112 is powered off, then the RFID reader 104 transmits a power-on command to the RFID tag of mobile device 112 to power on (i.e., turn on) mobile device 112. If the RFID reader 104 determines that the mobile device 112 is powered on, then the RFID reader 104 does not transit the power-on command.

The assembly line 122 then moves the mobile device to location 2 118, after the RFID reader 104 transmits the power-on command to the mobile device 112 (or alternatively after the mobile device 112 is determined to be powered on). In one or more embodiments, the movement of the mobile device 112 to the location 2 118 is performed in response to a signal from the RFID reader 104 that the power-on command has been transmitted to the mobile device 112 (or that the mobile device 112 has been determined to already be powered on). Alternatively, the assembly line 122 may move continuously at a particular rate slow enough (and/or with pauses or stops at predetermined intervals) so that it is assumed that the power-on command has been transmitted to the mobile device 112 by the RFID reader 104 while the mobile device is at location 1 116 (and thus within range of the RFID reader 104). Additionally, as the mobile device 112 arrives at location 2 118, another mobile device may arrive at location 1 116 and the RFID reader 104 repeats the above mentioned actions.

The RFID reader 106 continuously transmits an interrogation signal and when the mobile device 112 arrives at location 2 118, the RFID tag of the mobile device 112 is within communication range of the RFID reader 106 to receive the interrogation signal. In response to receiving the interrogation signal from RFID reader 106, the RFID tag of the mobile device 112 transmits the power-state indicator to the RFID reader 106. The RFID reader 106 receives the power-state indicator and communicates the power-state indicator to test module 124 of testing system 102. The test module 124 waits until the mobile device 112 is powered on by continuously transmitting the interrogation signal via RFID reader 106 until the power-state indicator indicates that the mobile device 112 is powered on. The test module 124 then transmits a command via the RFID reader 106 to start execution of a test program stored in memory of the RFID tag of mobile device 112 or in other memory of the mobile device 112 after the mobile device 112 is determined to be powered on. In one or more embodiments, the test module 124 also transmits, via the RFID reader 106, the test program to the mobile device 112, which receives the test program from the RFID reader 106 and stores the test program in the memory of the RFID tag or in other memory of the mobile device 112.

Alternatively, similar to the discussion above regarding the RFID reader 104, the RFID reader 106 can itself determine whether the mobile device 112 is powered on. The RFID reader 106 waits until the mobile device 112 is powered on by continuously transmitting the interrogation signal until the power-state indicator indicates that the mobile device 112 is powered on. The RFID reader 106 then transmits a command to start a test program stored in memory of the RFID tag of mobile device 112 or in other memory of the mobile device 112 after the mobile device 112 is determined to be powered on. In one or more embodiments, the RFID reader 106 also transmits the test program to the mobile device 112, which receives the test program from the RFID reader 106 and stores the test program in the memory of the RFID tag or in other memory of the mobile device 112.

The mobile device 112 executes the test program and the results of the test program can be stored in memory of the RFID tag of mobile device 112 or in other memory of the mobile device 112 (e.g., memory 204 as discussed below with respect to FIG. 2). The results of the test program can be data generated by the test program or another program (e.g., invoked by the test program). The mobile device 112 then transmits the results of the test program to the test module 124 of the testing system 102. The results of the test program can be maintained in memory of the RFID tag of the mobile device or in other memory of the mobile device 112 after being transmitted to the test module 124, or alternatively can be deleted from the memory of the RFID tag of the mobile device or other memory of the mobile device 112 after being transmitted to the test module 124.

In one or more embodiments, the mobile device includes a Wi-Fi or other wireless transceiver that transmits the results of the test program to the wireless transceiver 126 of the testing system 102. The wireless transceiver 126 receives the results of the test program from the mobile device 112, and communicates the results of the test program to the test module 124.

In one or more embodiments, the network 108 includes one or more wireless routers to create a Wi-Fi network to communicatively couple the wireless transceiver 126 of testing system 102 and the Wi-Fi transceiver of the mobile device 112. The Wi-Fi network can be a secure network (e.g., using various security protocols, such as Wi-Fi Protected Access 2 (WPA2)) and require authentication in order for a device to join the Wi-Fi network. In such situations, Wi-Fi information that includes authentication information to allow the mobile device 112 to join the Wi-Fi network can be transmitted to the mobile device 112 via the RFID reader 104 to enable the results of the test program to be communicated to the test module 124. Alternatively, the wireless transceiver 126 of testing system 102 and the Wi-Fi transceiver of mobile device 112 support other protocols (such as Wi-Fi Direct™) that allow a peer-to-peer transfer of data, such as the results of the test program.

Alternatively, the results of the test program can be transmitted from the mobile device 112 to the wireless transceiver 126 of testing system 102 using other wireless protocols. For example, the mobile device 112 can include a Bluetooth™ transceiver and the results of the test program can be transmitted via Bluetooth™ communications. By way of another example, the results of the test program can be transmitted via the RFID tag of mobile device 112 to RFID reader 106 (or alternatively RFID reader 108), which then communicates the results of the test program to test module 124.

The test module 124 is implemented to receive the results of the test program by any suitable communication method from the mobile device, such as the techniques described above. When the results of the test program have been received, the test module 124 can take various actions such as storing the results of the test program in memory of the testing system 102, transmitting the results of the test program to one or more other systems or devices, and so forth.

The assembly line 122 then moves the mobile device to location 3 120, after the RFID reader 106 transmits the command to start execution of the test program to the mobile device 112 (or alternatively after the results of the test program are communicated by the mobile device 112). In one or more embodiments, the movement of the mobile device 112 to the location 3 120 is performed in response to a signal from the RFID reader 106 that the command to start execution of a test program has been transmitted to the mobile device 112 (or that the results of the test program have been received by the testing system 102). Alternatively, the assembly line 122 may move continuously at a particular rate slow enough (and/or with pauses or stops at predetermined intervals) so that it is assumed that the command to start execution of a test program has been transmitted to the mobile device 112 by the RFID reader 104 (or that the results of the test program have been received by the testing system 102) while the mobile device 112 is at location 2 118 (and thus within range of the RFID reader 106). Additionally, as the mobile device 112 arrives at location 3 120, another mobile device may arrive at location 2 118 and the RFID reader 106 repeats the above mentioned actions.

Alternatively, the mobile device may be moved to location 3 120 via the assembly line 122 subsequent to the RFID tag of the mobile device receiving the command to start the test program. The test program executes and generates results, and the results of test program can be stored in memory of the RFID tag of the mobile device or in other memory of the mobile device while the mobile device 112 is at or being moved to location 3 120. The mobile device 112 then transmits the results of the test program to test module 124 of the testing system 102 as discussed above.

After the results of the test program are stored in memory of the testing system 102, the mobile device 112 can be moved to location 3 120 or the mobile device 112 may already be at location 3 120. The test module 124 can transmit a command via the RFID reader 108 to the RFID tag of the mobile device 112 to power off (i.e., turn off) the mobile device 112. Alternatively, similar to the discussion above regarding the RFID reader 104 and the RFID reader 106, the RFID reader 108 can itself, independent of any command from the testing system 102, transmit a command to the RFID tag of the mobile device 112 to power off the mobile device 112.

In the example of FIG. 1, three different RFID readers 104, 106, and 108 are illustrated. Alternatively, the operations of two or more of the RFID readers 104, 106, and 108 can be combined into a single RFID reader. For example, a single RFID reader may detect the mobile device 112, transmit a command to power on the mobile device 112, and transmit a command, after verifying that the mobile device 112 is powered on, to run a test program. Furthermore, the single RFID reader may also send a command, after the test program is run, to power off the mobile device 112.

Figure 2:
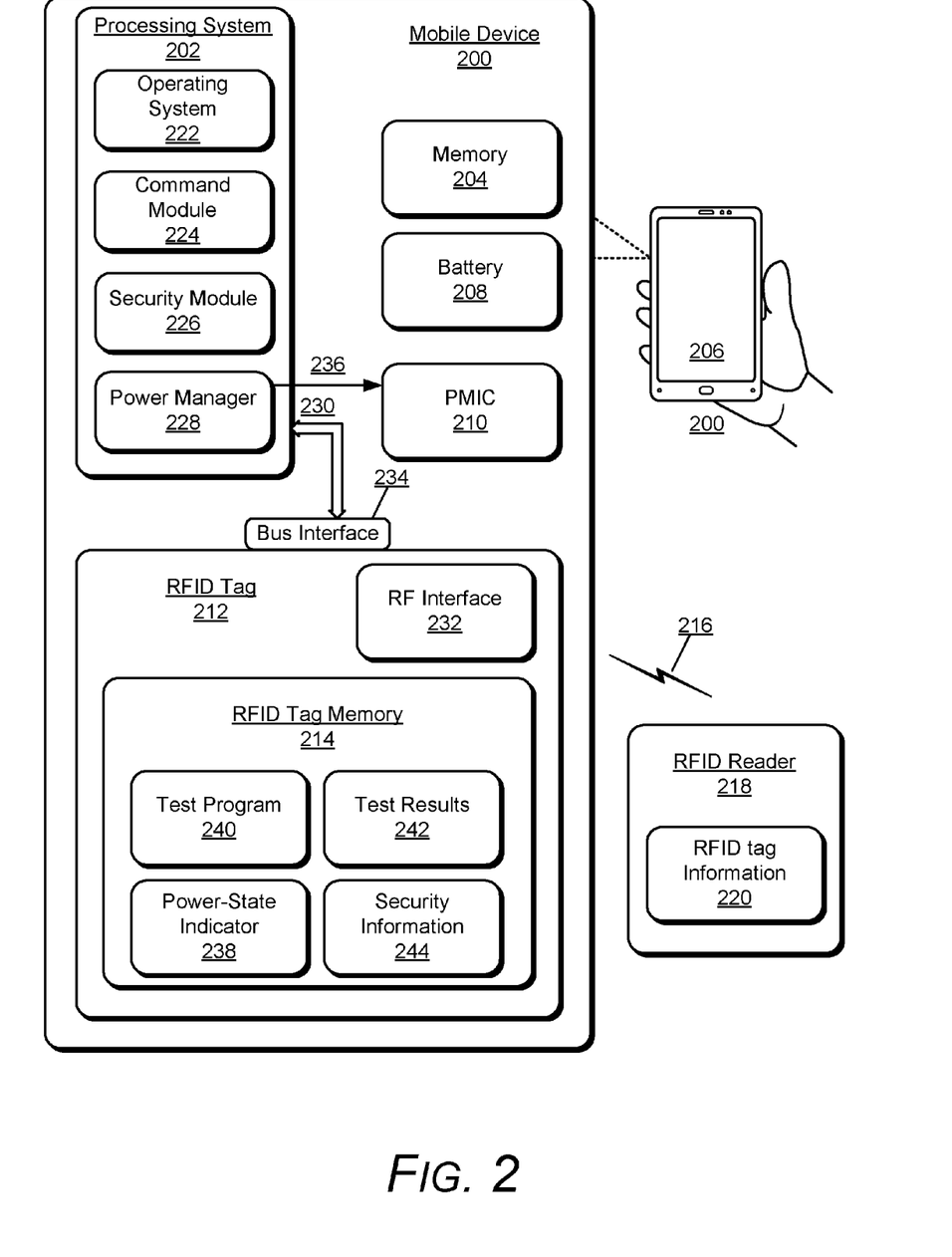
FIG. 2 illustrates an example mobile device that can be used with the automating device testing using RFID techniques discussed herein.

FIG. 2 illustrates an example mobile device 200 that can be used with the techniques discussed herein. The mobile device 200 may be any type of mobile phone, tablet device, digital camera, or other types of computing and electronic devices that are typically battery powered. The mobile device 200 can be, for example, the mobile device 112 shown in FIG. 1.

The mobile device 200 can be implemented with various components, such as a processing system 202 (e.g., one or more processors), a memory 204, an integrated display device 206, and any number and combination of various components as further described with reference to the example device shown in FIG. 5. Additionally, the mobile device 200 includes a power source, such as a battery 208, to power the various device components. The mobile device 200 also includes a power management integrated circuit (PMIC) 210 that includes an input/output (I/O) signal line that can be toggled to power-up or power-down the mobile device. Further, the mobile device 200 can include the different wireless radio systems, such as for Wi-Fi, Bluetooth™, Mobile Broadband, LTE, Near Field Communication (NFC), or any other wireless communication system or format for communication via respective wireless networks.

The mobile device 200 implements components and features of an RFID tag 212 that is implemented to store, in memory 214 of the RFID tag, a power status, data or information, executable instructions, and security-related information associated with the mobile device 200 even when the mobile device is powered off. Alternatively, any suitable non volatile memory (e.g., the device memory 204) can be used to store the data and information that is associated with the mobile device 200 separate from the RFID tag 212. The RFID tag 212 is also implemented for two-way wireless communication 216 with RFID readers, such as an RFID reader 218 (also referred to as an RFID interrogator) that interrogates the RFID tag 212 for the data and information stored in the RFID tag memory 214. The RFID reader 218 can be any one of the RFID readers 104, 106, and 108 shown in FIG. 1. Generally, RFID tags are small electronic tags or labels that can be programmed with data and other information, and typically has a communication range of approximately three feet. The RFID reader can transmit an interrogation signal as a broadcast message requesting RFID tags that are in communication range to return the data and information that the RFID tags have stored. The RFID tags can then wirelessly communicate the data and information to the RFID reader via a radio frequency (RF) communication channel, which the RFID reader 218 receives as the RFID tag information 220.

In implementations, an RFID tag (e.g., the RFID tag 212) can include an ASIC/CPU module, a communication bus for communicating with the processing system 202, and a transmitter and receiver (or may be implemented as a transceiver) for two-way communication 216 with the RFID reader 218. In response to receipt of an interrogation signal, the ASIC/CPU module of the RFID tag 212 formulates a response that may include data from the RFID tag, and the response is wirelessly transmitted to the RFID reader 218. The response signals from an RFID tag can be communicated using low frequency (LF), high frequency (HF), or ultra-high frequency (UHF) radio waves. The RFID tag data can be stored in non-volatile memory, and the ASIC/CPU module can be implemented as fixed or programmable logic for processing the RFID tag data, as well as modulating and demodulating the RF signals.

In this example, the processing system 202 of the mobile device 200 includes an operating system 222, a command module 224, a security module 226 and a power manager 228 to implement embodiments of automating device testing using RFID. The command module 224, the security module 226, and the power manager 228 can be implemented as a software application or module, such as computer-executable software instructions that are executable with a processor (e.g., with the processing system 202). As software applications, the operating system 222, the command module 224, the security module 226, and the power manager 228 can be stored on computer-readable storage memory (e.g., the device memory 204), such as any suitable memory device or electronic data storage implemented in the mobile device. Further, although shown and described as separate components, the command module 224, the security module 226, and the power manager 228 may be implemented as a module or component of the operating system 222. In implementations, the processing system 202, to include the operating system 222, the command module 224, the security module 226, and/or the power manager 228, can communicate with the RFID tag 212 via a communication bus 230 and a bus interface 234 that are implemented in the mobile device 200.

In one or more embodiments, the RFID tag memory 214 (e.g., non-volatile memory) can be accessed by the RFID reader 218 via a radio frequency (RF) interface 232 of the RFID tag 212, or can be accessed via a bus interface 234 that connects the communication bus 230 to the RFID tag 212. The processing system 202 can communicate with the RFID tag 212 via the communication bus 230 and the bus interface 234 when the mobile device 200 is powered-on. For example, the power-state indicator 238 of the mobile device 200 can be periodically saved into the RFID tag memory 214 of the RFID tag 212 by a command sent from the power manager 228 of the processing system 202 via the communication bus 230 while the mobile device 200 is powered on. The power-state indicator 238 is maintained in the RFID tag memory 214 even when the mobile device is powered off, and is an indication of whether the mobile device 200 is currently powered on or powered off In implementations, the power-state indicator 238 can be a status bit set by the power manager 228 to a binary value of one (1) indicating that the mobile device 200 is powered on, or set to a binary value of zero (0) indicating that the mobile device 200 is powered off.

In one or more embodiments, an antenna of the RFID tag 212 is always enabled regardless of whether the mobile device 200 is powered on or powered off. The RFID reader 218 can then determine whether the mobile device 200 is powered on or powered off by reading the power-state indicator 238. For example, the RFID reader 218 can interrogate the RFID tag 212 and in response, receive the power-state indicator 238 as a binary value of one (1) indicating that the mobile device 200 is powered on, or as a binary value of zero (0) indicating that the mobile device 200 is powered off. Similarly, other data or information maintained in the RFID tag memory 214 can be provided to the RFID reader 218 even when the mobile device 200 is powered off.

In one or more embodiments, the command module 224 of processing system 202 can communicate with the RFID tag 212 via the communication bus 230 and the bus interface 234 to initiate execution of test program 240 stored in the RFID tag memory 214 of RFID tag 212. Additionally, the security module 226 of processing system 202 can communicate with the RFID tag 212 to read or write security information 244, where the security information 244 can include a passcode, a private key, a digital signature, Wi-Fi access settings, and the like. In implementations, the test program 240 stored in the RFID tag memory 214 can be encrypted using a public key and the security module 226 of processing system 202 communicates with the RFID tag 212 via the communication bus 230 and the bus interface 234 to obtain security information 244 that includes the private key for decrypting the test program 240. When the test program 240 is decrypted, the command module 224 can then initiate the processing system 202 to execute the test program 240.

In embodiments, the RFID tag 212 may include a cryptographic engine module (not shown) that can be implemented to encrypt, decrypt, and authenticate data stored in the RFID tag memory 214. Alternatively or in addition, the cryptographic engine module can be a module or component of the processing system 202 or the cryptographic engine module can be a module or component of the operating system 222. For example, the RFID tag 212 of mobile device 200 can receive from the RFID reader 218 a digital signature and executable instructions, such as test program 240, to store in the RFID tag memory 214. The cryptographic engine module can be implemented to authenticate the executable instructions using the digital signature prior to storing the executable instructions in the RFID tag memory.

In implementations, the RFID tag memory 214 of the RFID tag 212 can be passcode protected that allows storing data into the RFID tag memory 214 only if the correct passcode is provided. If a passcode is not provided or an incorrect passcode is provided, then the ASIC/CPU module of the RFID 212 ignores a request to store data into the RFID tag memory 214. For example, the processing system 202 executes the test program 240, the test program 240 can include instructions to generate and store results of the test program 240 (e.g., test results 242) into the RFID tag memory 214. If the RFID tag memory 214 is passcode protected, then the test program 240 can include instructions to obtain the correct passcode from the security module 226 to allow the results of the test program 240 to be saved into the RFID tag memory 214 of the RFID tag 212. Additionally, the security module 226 can be implemented to obtain the passcode for the RFID tag memory 214 from the device memory 204.

In implementations, the device memory 204 of the mobile device 200 can be passcode protected that allows storing data into the device memory 204 only if the correct passcode is provided. If a passcode is not provided or an incorrect passcode is provided, then a memory controller of the device memory 204 ignores a request to store data into the device memory 204. For example, the processing system 202 executes the test program 240, the test program 240 can include instructions to store results of the test program 240 (e.g., test results 242) into the device memory 204. If the device memory 204 is passcode protected, then the test program 240 can include instructions to obtain the correct passcode from the security module 226 to allow the results of the test program 240 to be saved into the device memory 204. The security module 226 can be implemented to obtain the passcode for the device memory 204 from the security information 244 in the RFID tag memory 214.

The use of passcodes, encryption, authentication of instructions and/or data, and so forth provide protection for the mobile device 200 against malicious programs being stored in the RFID tag memory 214 and/or memory 204. This allows the automated testing as discussed herein to be performed, but prevents other unauthorized users or devices from storing instructions and/or data into the memory 214 and/or 204 after the mobile device 200 leaves the assembly line. Additionally or alternatively, such actions can be prevented in other manners. For example, after leaving the assembly line, the RFID tag memory 214 can be locked (optionally except for the power-state indicator 238), thereby preventing other instructions or data to be written to the RFID tag memory 214. By way of another example, the RFID tag 212 can be disabled prior to leaving the factory, thereby preventing any instructions or data to be written to the RFID tag memory 214 after the mobile device 200 leaves the factory.

In one or more embodiments, an output signal line 236 is connected to the PMIC 210 of the mobile device 200, and the PMIC 210 can be turned on and off via an output signal from the RFID tag 212, via the bus interface 234 and the communication bus 230 to the power manager 228. The toggling of the output signal line 236 causes the PMIC 210 to power on or power off the mobile device 200. In embodiments, the mobile device 200 can be wirelessly powered-up (e.g., turned-on) or powered-down (e.g., turned off) by a command sent from the external RFID reader 218 to the RFID tag 212, which then communicates the command to the power manager 228 that toggles the output signal line 236 connected to the PMIC 210.

In implementations, an antenna of the RFID 212 can be enabled or disabled via a command sent from the processing system 202 via the communication bus 230 and the bus interface 234. For example, the power manager 228 of the processing system 202 communicates with the RFID tag 202 to initiate the RFID tag enabling the antenna, and to initiate the RFID tag disabling the antenna. In embodiments, a command received from the RFID reader 218 is communicated to the command module 224, which can invoke the power manager 228 to enable or disable the antenna of the RFID 212. In other embodiments, the test program 240 can include executable instructions to enable or disable the antenna of the RFID tag 212.

It should be noted that although the test program 240 is illustrated as being included in RFID tag memory 214, alternatively the test program 240 (or at least part of the test program 240) can be included in memory 204. For example, if the test program 240 is too large to fit in the RFID tag memory 214, the test program 240 can be stored in the memory 204. In one or more embodiments, the test program 240 is received from the RFID reader 218 as discussed above and stored in RFID tag memory 214, or alternatively the RFID tag 212 is used as a bridge to receive the test program 240 from the RFID reader 218 and store the test program 240 in the memory 204.

Example methods 300 and 400 are described with reference to respective FIGS. 3 and 4 in accordance with implementations of automating device testing using RFID. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
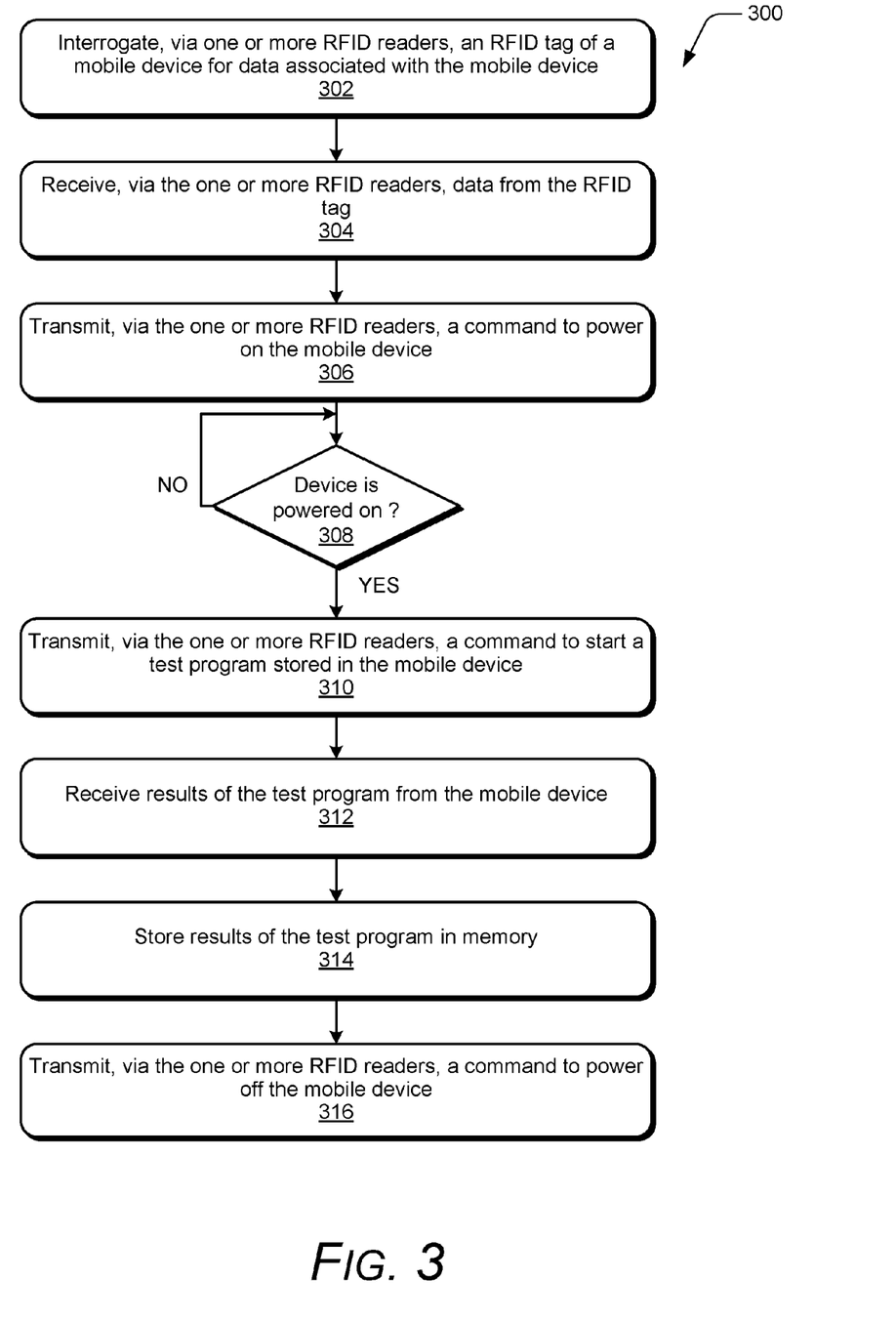
FIG. 3 illustrates example method of automating device testing using RFID in accordance with one or more embodiments.

FIG. 3 illustrates an example method 300 of automating device testing using RFID in accordance with one or more embodiments. The method 300 is performed by one or more RFID readers (such as RFID readers 104, 106, and 108 shown in FIG. 1) and optionally a testing system (such as testing system 102 shown in FIG. 1). The order in which the method is described is not intended to be construed as a limitation, and any number or combination of the described method operations can be performed in any order. The method 300 is discussed with additional reference to FIG. 1.

At 302, an RFID tag of a mobile device is interrogated for RFID data associated with the mobile device when the mobile device is at a location that is within communication range of an RFID reader. The interrogation can be performed by, for example, the RFID reader 104. The RFID reader can initiate the interrogation on its own, or in response to a communication from a testing system (e.g., test module 124 of testing system 102).

At 304, the data from the RFID tag is received and, at 306, the one or more RFID readers transmit a command to the RFID tag to power on the mobile device. The data received from the RFID tag can be various indicators, information, or other data. Optionally, the data from the RFID tag is a power-state indicator, and the command to power on the mobile device is transmitted only if the mobile device is in a powered-off state. The command to power on the mobile device can be transmitted by, for example, the RFID reader 104. The RFID reader can transmit the command to power on the mobile device on its own, or in response to a communication from a testing system (e.g., test module 124 of testing system 102).

At 308, a determination is made as to whether the mobile device is powered on subsequent to the transmitted power on command at 306. For example, an RFID reader can continuously interrogate the RFID tag and receive the power-state indicator from the RFID tag subsequent to transmitting the command to power on the mobile device. The interrogation can be performed by, for example, the RFID reader 106. The RFID reader can initiate the interrogation on its own, or in response to a communication from a testing system (e.g., test module 124 of testing system 102).

A determination is made as to whether the mobile device is powered on based on the power-state indicator. If the device is not powered on (i.e., "No" from 308), then the process waits by repeating the process at 308.

If the mobile device is powered on (i.e., "Yes" from 308), then at 310, an RFID reader transmits a command to start a test program stored in the mobile device. The command to start the test program can be transmitted by, for example, the RFID reader 106. The RFID reader can transmit the command to start the test program on its own, or in response to a communication from a testing system (e.g., test module 124 of testing system 102).

At 312, results of the test program are received from the mobile device. The results are received by a device external to the mobile device, such as the testing system 102. The results optionally include an identifier of the mobile device that executed the test program, allowing results to be associated with particular mobile devices (e.g., after the devices have moved off an assembly line).

At 314, the results of the test program are stored in memory of the computing device. The results can additionally or alternatively be communicated to one or more other devices or systems.

At 316, an RFID reader transmits a command to power off the mobile device. The command to power off the mobile device can be transmitted by, for example, the RFID reader 106. The RFID reader can transmit the command to power off the mobile device on its own, or in response to a communication from a testing system (e.g., test module 124 of testing system 102).

In one or more embodiments, three different RFID readers are used to implement the method 300. For example, one RFID reader to interrogate the RFID tag at 302 and transmit the command to power on the mobile device at 306, another RFID reader to verify that the device is powered on at 308 and transmit the command to start the test program at 310, and another RFID reader to transmit the command to power off the mobile device at 316. Alternatively, the actions performed by these three different RFID readers can be combined and performed by a single RFID reader or by two RFID readers. In other alternatives, the actions performed by these three different RFID readers can be performed by four or more RFID readers.

Figure 4:
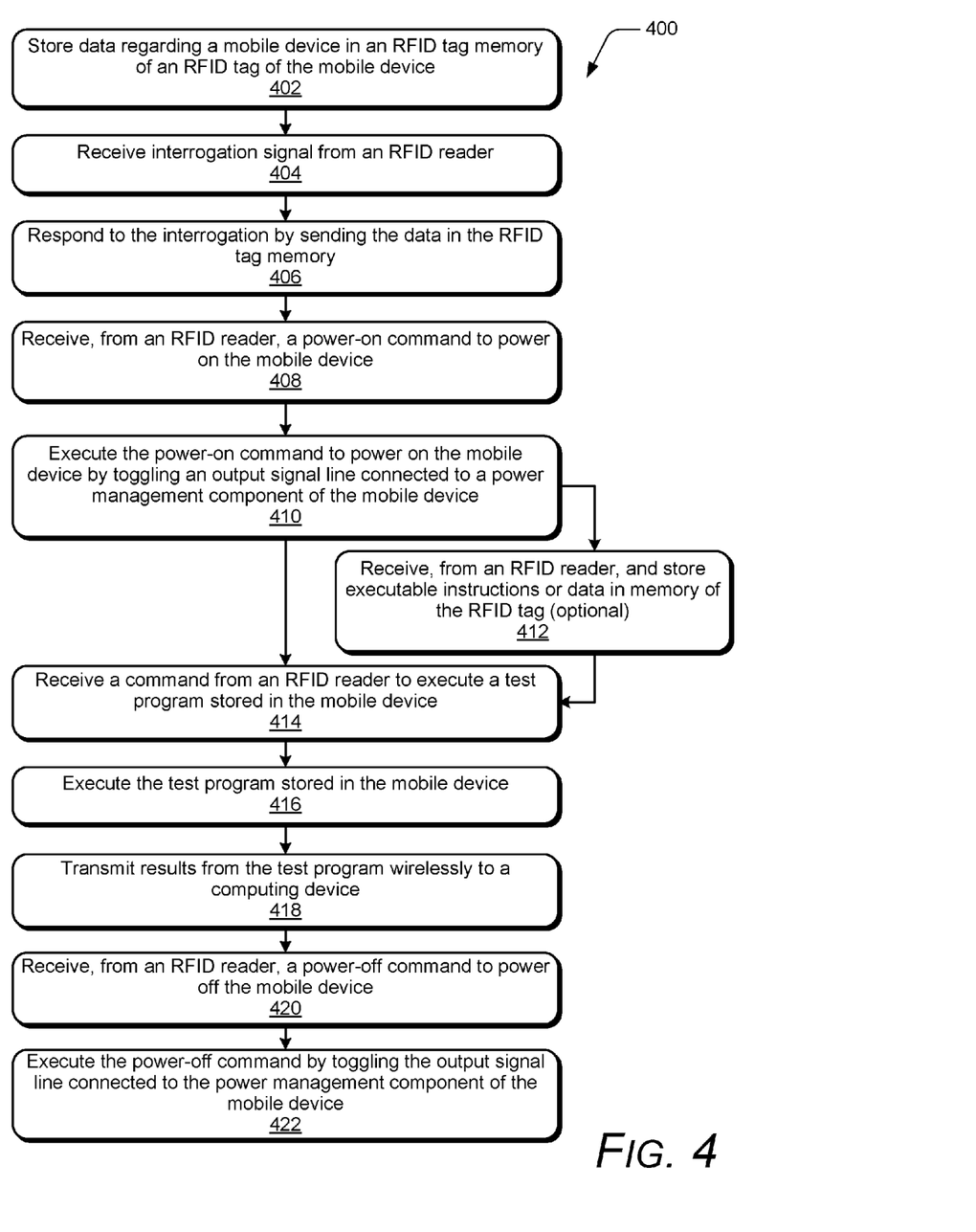
FIG. 4 illustrates another example method of automating device testing using RFID in accordance with one or more embodiments.

FIG. 4 illustrates another example method 400 of automating device testing using RFID in accordance with one or more embodiments. The method 400 is performed by a mobile device, such as mobile device 112 shown in FIG. 1 or mobile device 200 shown in FIG. 1. The order in which the method is described is not intended to be construed as a limitation, and any number or combination of the described method operations can be performed in any order. The method 400 is discussed with additional reference to FIG. 2.

At 402, data regarding the mobile device is stored in an RFID tag memory of an RFID tag of the mobile device. The data can be, for example, a power-state indicator that indicates the power-on state or the power-off state for the mobile device. For example, the power manager 228 of processing system 202 in mobile device 200 can periodically save the power-state indicator 238 to the RFID tag memory 214 of the RFID tag 212 via the communication bus 230 and the bus interface 234.

At 404, an interrogation signal from an RFID reader is received, and at 406 the RFID tag responds by transmitting at least some of the data stored in the RFID tag memory.

At 408, a power-on command is received from an RFID reader to remotely power-on the mobile device. At 410, the power-on command is processed to power on the mobile device. The power-on command is processed by, for example, the command module 224 or the power manager 228 toggling the output signal line 236 connected to the PMIC 210 to power-on the mobile device.

At 412, executable instructions and/or data are optionally received from an RFID reader and stored in the RFID tag memory of the RFID tag. These executable instructions and/or data can be, for example, one or more test programs. Additionally, a passcode can be received included with the executable instructions and/or data, and the RFID tag 212 verifies the passcode, allowing the executable instructions and/or data to be saved in the RFID tag memory 214 only if the passcode is verified. A digital signature or private key can also be included with the executable instructions and/or data, and the RFID tag 212 can authenticate the executable instructions and/or data prior to storing the executable instructions and/or data in the RFID tag memory 214 (storing the executable instructions and/or data in the RFID tag memory 214 only if the digital signature is authenticated).

At 414, a command is received from an RFID reader to execute the test program stored in the RFID tag memory in the mobile device. This test program can be a program received at 412, or a program previously stored in the RFID tag memory or other memory of the mobile device. At 416, the test program stored in the mobile device is executed. For example, the RFID tag 212 communicates the received command from the RFID reader 218 to the command module 224 via the communication bus 230 and the bus interface 234. The command module 224 processes the received command and invokes the processing system 202 to execute the test program 240 stored in the RFID tag memory 214.

At 418, results from the test program are transmitted wirelessly to a computing device. The results are transmitted to a device external to the mobile device, such as the testing system 102 shown in FIG. 1.

At 420, a power-off command is received from the RFID reader to remotely power-off the mobile device. At 422, the power-off command is processed to power-off the mobile device. For example, the command module 224 or the power manager 228 toggles the output signal line 236 connected to the PMIC 210 to power-off the mobile device 200.

It should be noted that the techniques discussed herein support various additional usage scenarios. For example, prior to sending the command to power off the mobile device, an RFID reader (e.g., the RFID reader 108 shown in FIG. 1) can transmit additional evaluation or diagnostic programs to the mobile device. The mobile device receives and stores these additional programs in memory of the RFID tag or other memory of the computing device. These evaluation or diagnostic programs can subsequently be used by other authorized users (e.g., repair personnel) to assist in the repair of the mobile device if it is subsequently damaged. Additional evaluation or diagnostic programs can also optionally be transmitted to the mobile device and stored in memory of the RFID tag or other memory of the computing device (e.g., if a proper passcode is provided, if a digital signature on the additional programs is authenticated, etc.), facilitating repair of the mobile device if it is subsequently damaged.

Figure 5:
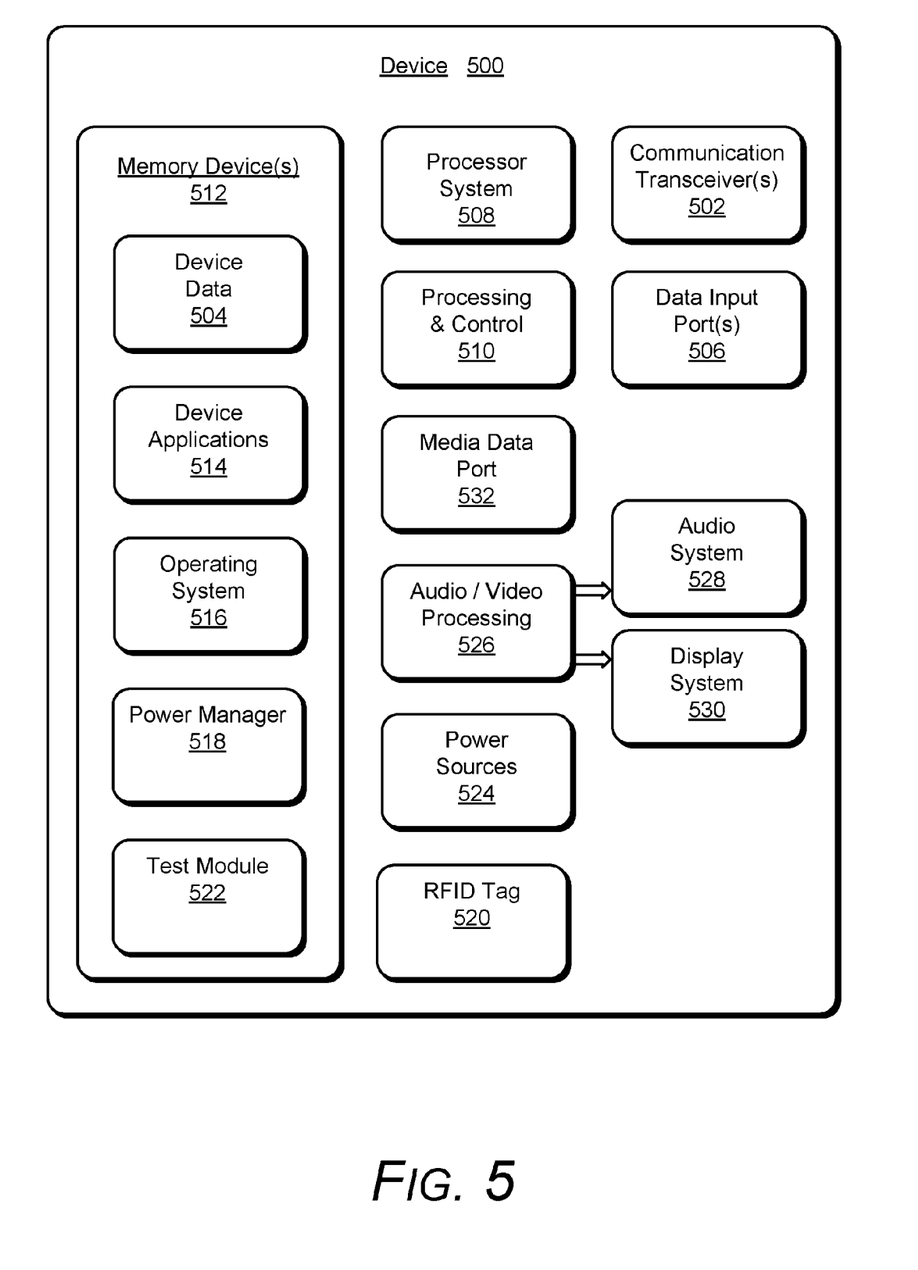
FIG. 5 illustrates various components of an example device that can implement embodiments of automating device testing using RFID.

FIG. 5 illustrates various components of an example device 500 in which embodiments of automating device testing using RFID can be implemented. The example device 500 can be implemented as any of the computing devices or mobile devices described with reference to the previous FIGS. 1-4, such as any type of client device, mobile phone, tablet, computing, communication, entertainment, gaming, media playback, and/or other type of device. For example, the testing system 102 shown in FIG. 1 may be implemented as the example device 500 and the mobile device 200 shown in FIG. 2 may be implemented as the example device 500.

The device 500 includes communication transceivers 502 that enable wired and/or wireless communication of device data 504 with other devices, such as the power-state indicator 238, the test program 240, the test results 242, and security information 244 as described with reference to the mobile device 200 shown in FIG. 2. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non volatile memory, fixed and removable media devices, and any suitable memory device or electronic data storage that maintains data for computing device access. The computer-readable storage memory can include various implementations of random access memory (RAM), read only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes a power manager 518 that implements embodiments of automating device testing using RFID, and may be implemented with hardware components and/or in software, such as when the device 500 is implemented as at least part of the testing system 102 or mobile device 200 described with reference to FIGS. 1-4. An example of the power manager 518 is the power manager 228 that is implemented as an application in the mobile device 200.

The device 500 also includes a radio-frequency identification (RFID) tag 520, such as described with reference to the RFID tag 212 implemented in the mobile device 200. The device 500 also includes test module 522, such as described with reference to the test module 124 implemented in the testing system 102. The device 500 can also include one or more power sources 524, such as when the device is implemented as a mobile device. The power sources may include a charging and/or power system, and can be implemented as a flexible strip battery, a rechargeable battery, a charged super-capacitor, and/or any other type of active or passive power source.

The device 500 also includes an audio and/or video processing system 526 that generates audio data for an audio system 528 and/or generates display data for a display system 530. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 532. In implementations, the audio system and/or the display system are integrated components of the example device. Alternatively, the audio system and/or the display system are external, peripheral components to the example device.

Although embodiments of automating device testing using RFID have been described in language specific to features and/or methods, the subject of the appended claims is not necessarily limited to the specific features or methods described. Rather, the specific features and methods are disclosed as example implementations of automating device testing using RFID, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method comprising:
    interrogating, by one or more radio-frequency identification (RFID) readers, an RFID tag of a mobile device;
    receiving, by the one or more RFID readers, data from the RFID tag responsive to the interrogating;
    transmitting, by the one or more RFID readers in response to receiving the data from the RFID tag, a command to initiate a processing system of the mobile device to execute a test program stored in the mobile device; and
    receiving results of the test program from the mobile device.

2. The method as recited in claim 1, the data from the RFID tag comprising a power-state indicator that indicates a power-on state or a power-off state of the mobile device.

3. The method as recited in claim 1, further comprising:
    transmitting, by the one or more RFID readers, a command to power on the mobile device, the command to power on the mobile device being transmitted in response to the one or more RFID readers receiving the data from the RFID tag; and
    transmitting, by the one or more RFID readers, a command to power off the mobile device, the command to power off the mobile device being transmitted in response to the one or more RFID readers receiving the results of the test program from the mobile device.

4. The method as recited in claim 1, wherein the one or more RFID readers includes a first RFID reader at a first physical location on an assembly line, a second RFID reader at a second physical location on the assembly line, and a third RFID reader at a third physical location on the assembly line.

5. The method as recited in claim 4, the first RFID reader transmitting the command to power on the mobile device, the second RFID reader transmitting the command to execute the test program, and the third RFID reader transmitting the command to power off the mobile device.

6. The method as recited in claim 1, wherein the receiving the results comprises receiving the results via a wireless transceiver that includes one of a Wi-Fi transceiver, a Bluetooth™ transceiver, a Near Field Communication (NFC) transceiver, or the one or more RFID readers.

7. The method as recited in claim 1, wherein the test program is stored in memory of the RFID tag of the mobile device and the test program includes executable instructions to enable or disable an antenna of the RFID tag of the mobile device.

8. The method as recited in claim 1, further comprising transmitting, by the one or more RFID readers, the test program to the RFID tag of the mobile device prior to the transmitting the command to execute the test program.

9. The method as recited in claim 1, further comprising: transmitting, via the one or more RFID readers, a passcode and data to store in the RFID tag memory of the RFID tag in the mobile device, the RFID tag validating the passcode to allow or deny the data to be stored in the RFID tag memory, the data including executable instructions or information.

10. A mobile device, comprising:
a radio-frequency identification (RFID) tag configured to store data in memory of the RFID tag and communicate with an RFID reader, the data including executable instructions;
a processing system to interface with the RFID tag via a communication bus, the processing system being configured to:
receive a command from the RFID tag to initiate execution of a test program, the command being communicated to the processing system in response to the RFID tag receiving the command from the RFID reader;
execute the test program stored in the memory of the RFID tag; and
wirelessly transmit data generated from the test program to a computing device.

11. The mobile device as recited in claim 10, wherein the processing system is implemented to communicate a power-state indicator of a power-on state or a power-off state of the mobile device to the RFID tag to be stored in the RFID tag memory.

12. The mobile device as recited in claim 10, wherein the processing system is further configured to receive the test program from the RFID reader and store the test program in the memory of the RFID tag.

13. The mobile device as recited in claim 10, wherein the processing system is implemented to:
process a power-on command received from the RFID tag, the power-on command being communicated to the processing system in response to the RFID tag receiving the power-on command from the RFID reader; and
process a power-off command received from the RFID tag, the power-off command being communicated to the processing system in response to the RFID tag receiving the power-of command from the RFID reader.

14. The mobile device as recited in claim 13, wherein:
the processing system comprises an output signal line connected to a power management integrated circuit (PMIC) of the mobile device;
to process the power-on command is to toggle the output signal line to power on the mobile device; and
to process the power-off command is to toggle the output signal line to power off the mobile device.

15. The mobile device as recited in claim 10, wherein the processing system is implemented to transmit the data generated from the test program via a Wi-Fi transceiver, a Bluetooth™ transceiver, a Near Field Communication (NFC) transceiver, or the RFID tag.

16. A system comprising:
one or more radio-frequency identification (RFID) readers;
a mobile device including an RFID tag configured to communicate with the one or more RFID readers;
a computing device configured to communicate with the one or more RFID readers;
a test module that is executable in the computing device and configured to:
interrogate, via the one or more RFID readers, the RFID tag of the mobile device;
transmit, via the one or more RFID readers, a first command to power on the mobile device;
transmit, via the one or more RFID readers, a second command to initiate a processing system of the mobile device to execute a test program stored in the mobile device;
receive results of the test program from the mobile device; and
transmit, via the one or more RFID readers, a third command to power off the mobile device.

17. The system as recited in claim 16, wherein the test module is further configured to receive data from the RFID tag of the mobile device responsive to the interrogation of the RFID tag, and transmit the first command responsive to receipt of the data from the RFID tag.

18. The system as recited in claim 16, wherein the receiving the results comprises receiving the results via Wi-Fi wireless communication.

19. The system as recited in claim 16, wherein the test module is further configured to:
transmit, by the one or more RFID readers, a passcode and data to store in memory of the RFID tag of the mobile device, the data including a public key that is a shared key between a processor of the mobile device and the RFID tag of the mobile device; and
transmit, by the one or more RFID readers, a fourth command to lock the memory of the RFID tag of the mobile device effective to not allow write operations in the memory of the RFID tag.

20. The system as recited in claim 16, wherein the one or more RFID readers are further configured to transmit the test program to the RFID tag of the mobile device.

* * * * *